US012750172B2

(12) United States Patent
Omar et al.

(10) Patent No.: US 12,750,172 B2
(45) Date of Patent: Sep. 29, 2026

(54) METHODS AND DEVICES FOR COORDINATED TRANSMIT OPPORTUNITY SHARING IN WIRELESS NETWORKS

(71) Applicant: HUAWEI TECHNOLOGIES CO., LTD., Shenzhen (CN)

(72) Inventors: Hassan Omar, Kanata (CA); Bo Ran, Shenzhen (CN); M Zulfiker Ali, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 296 days.

(21) Appl. No.: 18/424,184

(22) Filed: Jan. 26, 2024

(65) Prior Publication Data

US 2024/0235750 A1 Jul. 11, 2024

Related U.S. Application Data

(63) Continuation of application No. PCT/CN2021/108589, filed on Jul. 27, 2021.

(51) Int. Cl.
*H04L 5/00* (2006.01)

(52) U.S. Cl.
CPC .......... *H04L 5/0035* (2013.01); *H04L 5/0007* (2013.01); *H04L 5/006* (2013.01)

(58) Field of Classification Search
None
See application file for complete search history.

(56) References Cited

U.S. PATENT DOCUMENTS

| | | | | |
|---|---|---|---|---|
| 2018/0254993 | A1* | 9/2018 | Ahn | H04W 74/002 |
| 2020/0068585 | A1* | 2/2020 | Yoshikawa | H04L 5/0044 |
| 2020/0077273 | A1 | 3/2020 | Cherian et al. | |
| 2021/0168712 | A1 | 6/2021 | Cherian et al. | |
| 2021/0273757 | A1* | 9/2021 | Shellhammer | H04L 27/2607 |
| 2022/0361086 | A1* | 11/2022 | Wang | H04W 40/12 |
| 2023/0319866 | A1* | 10/2023 | Sedin | H04W 16/10 370/329 |

FOREIGN PATENT DOCUMENTS

| | | | | |
|---|---|---|---|---|
| CN | 105684542 | A | 6/2016 | |
| WO | WO-2014059795 | A1 * | 4/2014 | H04W 74/006 |
| WO | 2018164711 | A1 | 9/2018 | |

OTHER PUBLICATIONS

Ju, Kwangsung, et al. "Dynamic TXOP Allocation to Support Qos Based On . . . " NCM and ICNIT, Aug. 16, 2012.

(Continued)

*Primary Examiner* — Scott M Sciacca

(57) ABSTRACT

Methods and devices for coordinated transmit opportunity sharing in wireless networks are disclosed. In an embodiment, a method includes: receiving from each of one or more adjacent access points (APs), at an AP, a signal containing values of one or more parameters related to data transmission; determining, at the AP, whether the values of the one or more parameters are greater than respective predetermined thresholds for the one or more parameters; and responsive to the values of the one or more parameters greater than the respective predetermined thresholds, selecting, by the AP, one or more Co-APs as a first set of Co-APs from the one or more adjacent APs for sharing a transmit opportunity (TXOP) in a subsequent transmission of the AP.

19 Claims, 11 Drawing Sheets

(56) References Cited

OTHER PUBLICATIONS

Li, Zhou, et al. "Data Sharing Mechanism Based on Information Hiding in Opportunistic Transmission" Journal of Beijing Information Science & Technology University, CNKI, vol. 30, No. 4, Aug. 15, 2015 (Abstract Only) DOI : 10.16508/j.cnki.11-5866/n.2015.04.007.

Kwangsung Ju et al: "Dynamic TXOP allocation to support QoS based on channel conditions in wireless networks", 2012 8th International Conference on Computing Technology and Information Management (NCM and ICNIT), vol. 2, Apr. 1, 2012 (Apr. 1, 2012), pp. 721-724, XP093028752.

* cited by examiner

FIG. 3B

Measurement report frame format (330)

| | Category | Spectrum Management Action | Dialog Token | Measurement Report Elements |
|---|---|---|---|---|
| Octets: | 1 | 1 | 1 | variable |

Measurement report element format (331)

| | Element ID | Length | Measurement Token | Measurement Report Mode | Measurement Type | Measurement Report |
|---|---|---|---|---|---|---|
| Octets: | 1 | 1 | 1 | 1 | 1 | variable |

Measurement report field format for an STA statistics report

| | Measurement Duration | Group Identity (332) | Statistics Group Data | Optional Subelements |
|---|---|---|---|---|
| Octets: | 2 | 1 | variable | variable |

Group identity for access delay measurements (dot11BSSAverageAccessDelay group) (334)

| Group Identity Requested | Statistics Group Data field length (octets) | Statistics Returned |
|---|---|---|
| 10 | 8 | dot11BSSAvemgeAccessDelay Group (only available at an AP):<br>dot11STAStatisticsAPAverageAccessDelay (INTEGER).<br>dot11STAStaristicsAverageAccessDelayBestEffort (INTEGER).<br>dot11STAStatisticsAverageAccessDelayBackGrouud (INTEGER).<br>dot11STAStatisticsAverageAccessDelayVideo (INTEGER).<br>dot11STAStatisticsAverageAccessDelayVoice (INTEGER).<br>dot11STAStatisticsStationCouut (INTEGER).<br>dot11STAStatisticsChannelUtilizalion (INTEGER) |

Format of the dot11BSSAverageAccessDelay Statistics Group Data field (336)

| | dot11STA StatisticsAP AverageAccess Delay | dot11STA Statistics AverageAccess DelayBacground | dot11STA Statistics AverageAccess DelayBackGround | dot11STA Statistics AverageAccess DelayVideo | dot11STA Statistics AverageAccess DelayVoice | dot11STA Statistics StationCount | dot11STA Statistics Channel Utilization |
|---|---|---|---|---|---|---|---|
| Octets: | 1 | 1 | 1 | 1 | 1 | 2 | 1 |

METHODS AND DEVICES FOR COORDINATED TRANSMIT OPPORTUNITY SHARING IN WIRELESS NETWORKS

RELATED APPLICATIONS

This application is a continuation of International Patent Application No. PCT/CN2021/108589, filed 27 Jul. 2021, the contents of which are incorporated by reference in their entirety.

TECHNICAL FIELD

The present application relates to wireless air interface technologies, in particular to methods and devices for coordinated transmit opportunity sharing in wireless networks.

BACKGROUND

In May 2019, an IEEE 802.11 task group started developing a new Wi-Fi standard, referred to as the IEEE 802.11be (or Wi-Fi 7) standard. One of the main medium access control (MAC) features supported by the Wi-Fi 7 standard is coordinated transmit opportunity (Co-TXOP) sharing, which allows an access point (AP) that obtains a TXOP via channel contention to share its TXOP duration or bandwidth with a set of coordinated APs (Co-APs). When each of the Co-APs sharing a TXOP is offered by a TXOP owner a portion of the TXOP bandwidth for the whole TXOP duration, the resulting TXOP sharing type is referred to as coordinated orthogonal frequency division multiple access (Co-OFDMA).

By exploiting the TXOPs shared by other Co-APs, Co-TXOP sharing is expected to reduce the mean or standard deviation of the channel access delay for a Co-AP. However, when Co-OFDMA is employed, the duration of transmission of a physical layer protocol data unit (PPDU) by a TXOP owner AP may increase, due to PPDU transmission over a reduced bandwidth. As well, the employment of Co-OFDMA requires the exchange of control or overhead frames necessary for multi-AP coordination. Hence, Co-TXOP sharing based on Co-OFDMA creates a trade-off between the reduction of channel access delay and the increase of a PPDU transmission duration and additional control frame exchange.

There thus exists a need for optimizing total frame delivery delay when Co-TXOP sharing is used in a wireless network.

SUMMARY

The present application improves mean or standard deviation of the total frame delivery delay via Co-TXOP sharing, by efficiently enabling or disabling Co-TXOP sharing, as well as properly selecting one or more Co-APs with which an AP can share a TXOP of the AP, such as via Co-OFDMA.

In an aspect, there is provided a method comprising: receiving from each of one or more adjacent access points (APs), at an AP, a signal containing values of one or more parameters related to data transmission; determining, at the AP, whether the values of the one or more parameters are greater than respective predetermined thresholds for the one or more parameters; and responsive to the values of the one or more parameters greater than the respective predetermined thresholds, selecting, by the AP, one or more Co-APs as a first set of Co-APs from the one or more adjacent APs for sharing a transmit opportunity (TXOP) in a subsequent transmission of the AP.

In another aspect, there is provided an Access Point (AP), comprising: a processor, wherein the processor is configured to perform the preceding method.

In another aspect, there is provided a non-transitory processor readable medium having tangibly stored thereon executable instructions that, when executed by a processor, cause the processor to perform the preceding method.

BRIEF DESCRIPTION OF THE DRAWINGS

Reference will now be made, by way of example, to the accompanying drawings which show example embodiments of the present application, and in which:

FIG. 3B is an exemplary measurement report frame format for transmitting access delay measurement;

Similar reference numerals may have been used in different figures to denote similar components.

DETAILED DESCRIPTION

Figure 1:
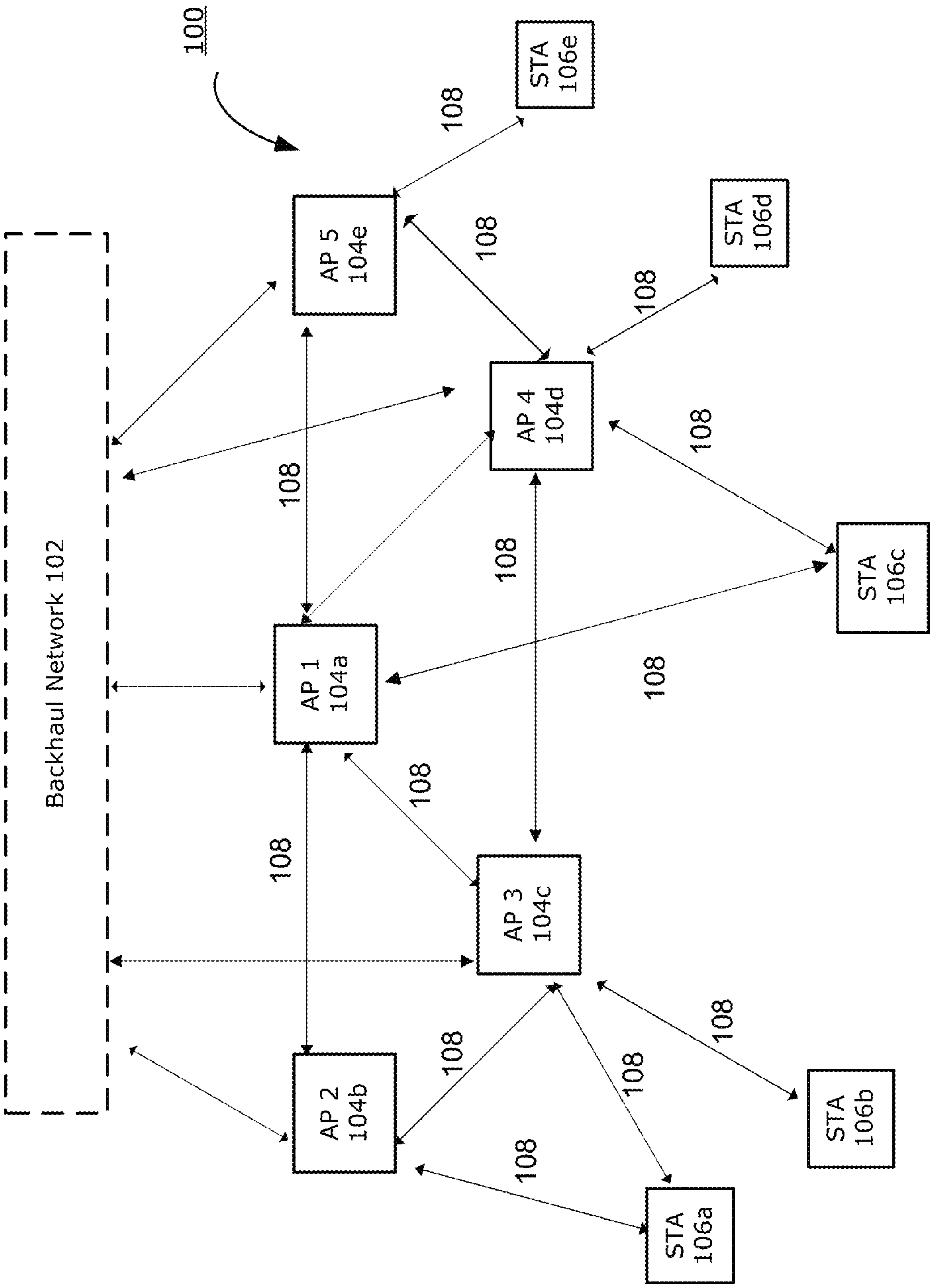
FIG. 1 is a block diagram of a wireless network, showing an example environment in which example embodiments in accordance with the present application may operate.

FIG. 1 illustrates an exemplary wireless network 100. The wireless network 100 may be a WLAN, a Wi-Fi network, or a next generation Wi-Fi compliant network that operates in accordance with one or more protocols from the 802.11 family of protocols. The wireless network 100 includes a plurality of the access points (APs) AP1 104*a*, AP2 104*b*, AP3 104*c*, AP4 104*d*, and AP5 104*e*, and one or more stations (STAs) 106*a*, 106*b*, 106*c*, 106*d*, and 106*e*.

Each of AP1 104*a*, AP2 104*b*, AP3 104*c*, AP4 104*d*, and AP5 104*e* may comprise a network access interface which functions as a wireless transmission and/or reception point for STAs 106*a*, 106*b*, 106*c*, 106*d*, and 106*e*. Each of AP1 104*a*, AP2 104*b*, AP3 104*c*, AP4 104*d*, and AP5 104*e* may be connected to a backhaul network 102 which enables data to be exchanged between AP1 104*a*, AP2 104*b*, AP3 104*c*, AP4 104*d*, or AP5 104*e* and other remote networks (including for example the Internet), nodes, routers APs, and devices (not shown). The backbone network may include one or more routers, switches, cables, optical fibers, and/or other network nodes or components.

Each AP is configured to receive data, via the air interface 108, from one or more STAs or from the backbone network 102, and to transmit data from on one or more STAs to the backbone network 102 or from the backbone network 102 to the STAs, via the air interface 108.

As well, each AP may communicate with one or more adjacent APs in the wireless network 100 via the air interface 108. A first AP may be an adjacent AP of a second AP, as long as the signal strength of the first AP received by the second AP is equal to or greater than a predetermined signal strength threshold, such as the signal sensitivity of the second AP. For example, the signal sensitivity level of an AP may be −82 dBm. The second AP may set the predetermined signal strength threshold to satisfy the signal quality requirements for communications between the first AP and the second AP.

For example, AP2 104*b*, AP3 104*c*, AP4 104*d*, or AP5 104*e* may be an adjacent AP of AP1 104*a* in FIG. 1, as long as the signal strength of AP2 104*b*, AP3 104*c*, AP4 104*d*, or AP5 104*e* received by AP1 104*a* is equal to or greater than a predetermined signal strength, such as −82 dBm.

Each of AP1 104*a*, AP2 104*b*, AP3 104*c*, AP4 104*d*, and AP5 104*e* may communicate with respective adjacent APs by multicasting or broadcasting signals in the air interface 108 on a signaling channel, such as a broadcasting channel. The multicasting or broadcasting signals may include the values of the one or more parameters, signaling data, or other control data.

Each of STA 106*a*, 106*b*, 106*c*, 106*d*, and 106*e* is configured to communicate with one or more of AP1 104*a*, AP2 104*b*, AP3 104*c*, AP4 104*d*, and AP5 104*e*. For example, in FIG. 1, STA 106*a* may communicate with both AP2 104*b* and AP3 104*c*, and STA 106*c* may communicate with AP1 104*a* and AP4 104*d*. Each of STA 106*a*, 106*b*, 106*c*, 106*d*, and 106*e* may be configured to receive data from one or more APs of AP1 104*a*, AP2 104*b*, AP3 104*c*, AP4 104*d*, and AP5 104*e*, or to transmit data to one or more APs of AP1 104*a*, AP2 104*b*, AP3 104*c*, AP4 104*d*, and AP5 104*e*, via air interface 108.

Each of STA 106*a*, 106*b*, 106*c*, 106*d*, and 106*e* may be a laptop, a desktop PC, PDA, Wi-Fi phone, wireless transmit/receive unit (WTRU), mobile station (MS), mobile terminal, smartphone, mobile telephone, sensor, internet of things (IOT) device, user equipment, or other wireless enabled computing or mobile device.

Figure 2:
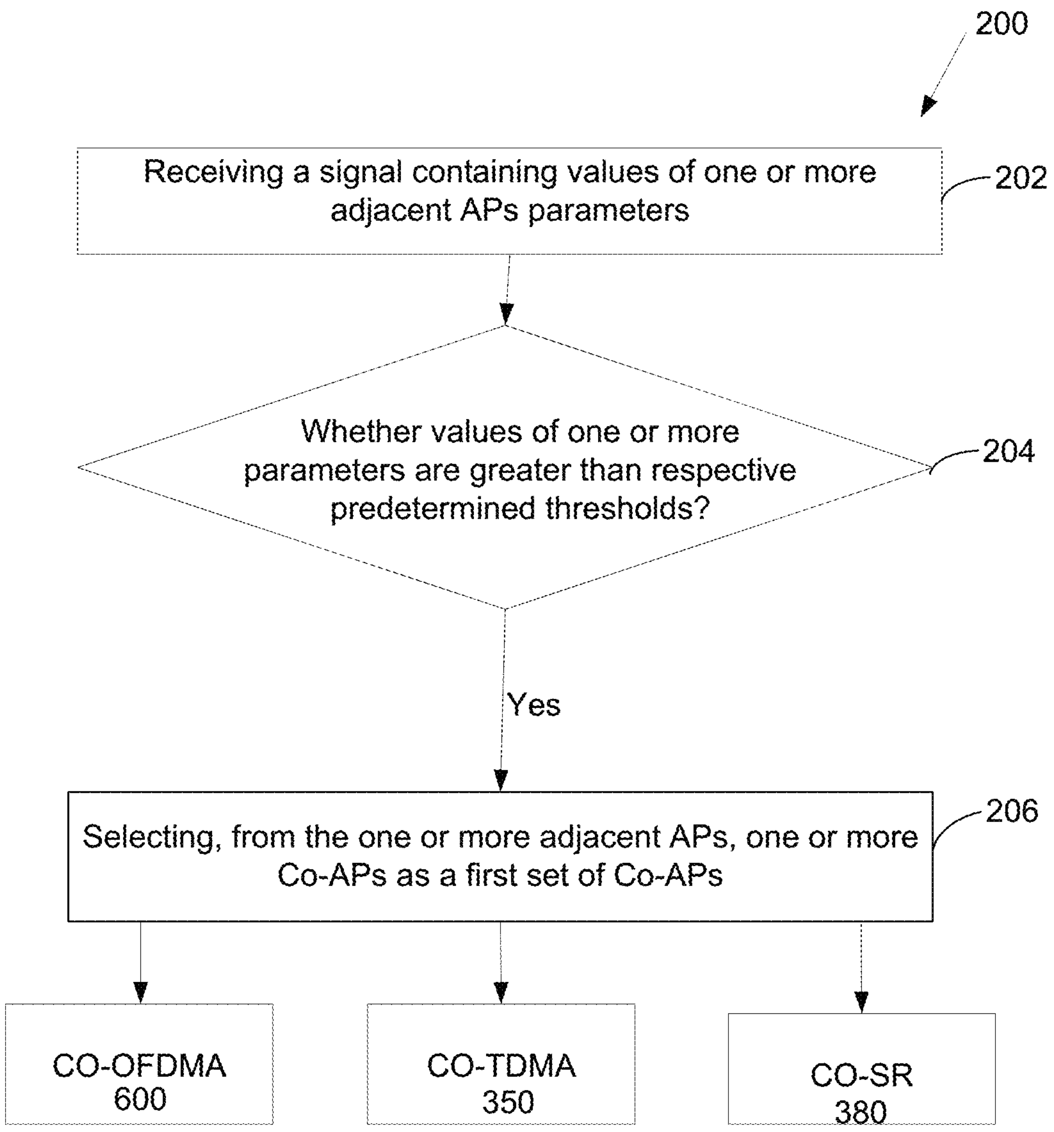
FIG. 2 is a flowchart showing the steps of a method for Co-TXOP sharing according to example embodiments described herein.

FIG. 2 illustrates exemplary steps of a method 200 for Co-TXOP sharing in a wireless network. In the example of wireless network 100, one or more APs of AP1 104*a*, AP2 104*b*, AP3 104*c*, AP4 104*d*, and AP5 104*e* may be configured to communicate with respective adjacent APs values of one or more parameters related to data transmission of the one or more adjacent APs on the air interface 108. Data transmission include packet transmission. The term 'packet' refers to a medium access control (MAC) layer service data unit (MSDU).

The parameters may include the average channel access delay for each access category (AC) of enhanced distributed channel access (EDCA) in a given period of an adjacent AP. Each AP is configured to determine the average channel access delay for the frames transmitted from each EDCA AC in a sliding time window.

In some examples, the parameters may also include current queue length, i.e., buffer status, which refers to the queue length for each EDCA AC of an AP at the time when the parameters are communicated to its adjacent APs. The current queue length for each EDCA AC of an AP may be the sum of downlink (DL) and estimated uplink (UL) traffic waiting in a queue until the traffic can be transmitted by the AP.

With EDCA, high-priority traffic has a higher chance to be transmitted than low-priority traffic. For example, a station with high priority traffic waits a shorter time before it sends its packet, on average, than a station with a low priority traffic. For example, a shorter arbitration inter-frame space (AIFS) may be used for higher priority packets. The levels of priority in EDCA are called access categories (ACs). The contention window (CW) can be set according to the traffic expected in each AC.

The values of parameters may be transmitted in a beacon frame of the one or more adjacent APs on the air interface 108. The beacon frame may be transmitted in a signal. The values of parameters may be periodically multicast or broadcast by one or more APs of AP1 104*a*, AP2 104*b*, AP3 104*c*, AP4 104*d*, and AP5 104*e*. Multicast or broadcast of the values of parameters can be performed using IEEE 802.11 standard measurement report frames or quality of service (QoS) Null frames. Each IEEE 802.11 standard measurement report frame and QoS Null frame includes a frame header with the buffer status information in the QoS Control or high throughput (HT) Control field. Each QoS Null frame includes an empty frame body. Each of the IEEE 802.11 standard measurement report frames includes a station (STA) Statistics report carrying the access delay measurements for each AC of the transmitting AP.

Figure 3A:
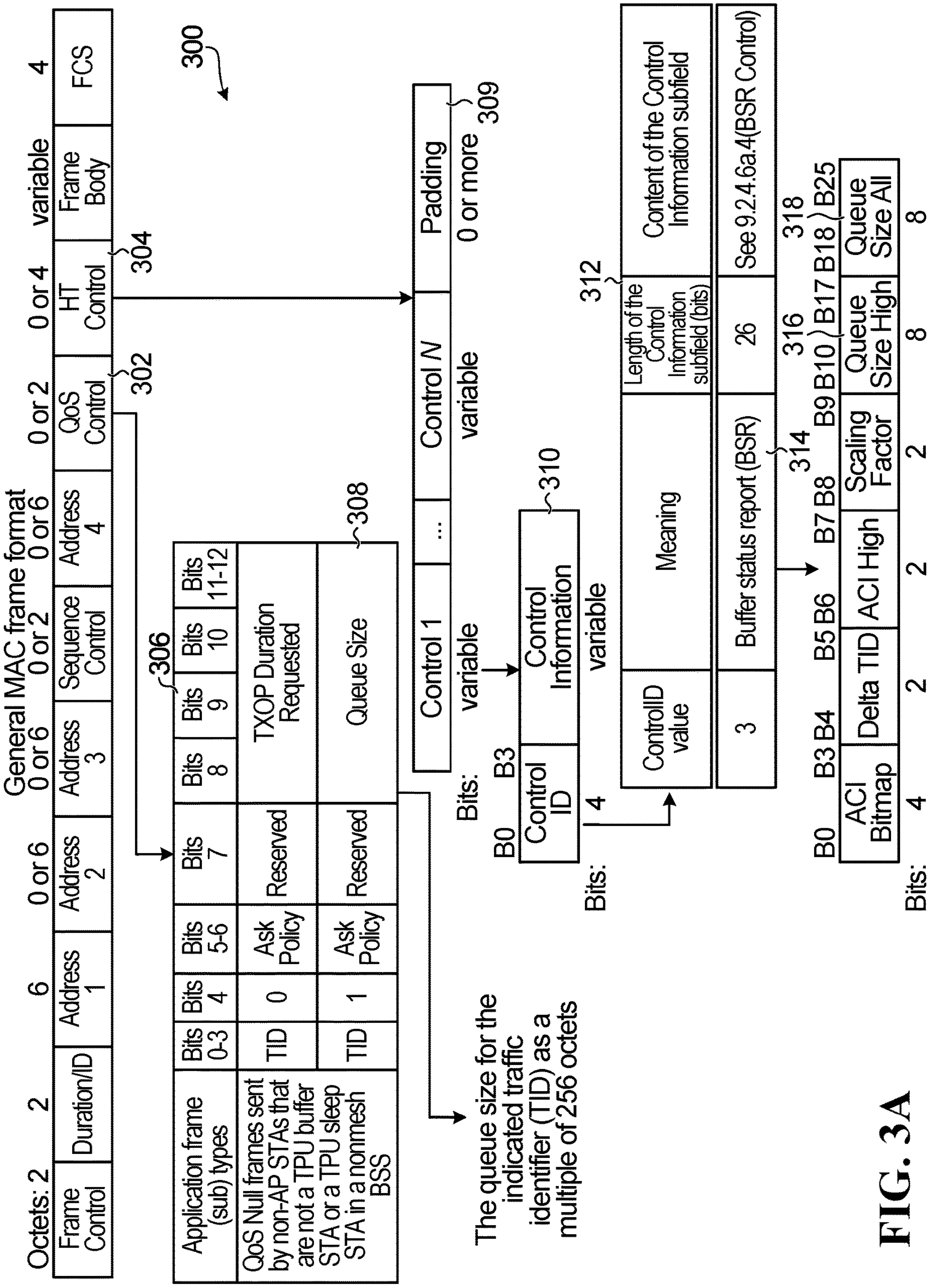
FIG. 3A is an exemplary MAC frame format for transmitting buffer status information.

FIG. 3A illustrates an example of buffer status or queue size information in a QoS Control or HT Control field of a MAC frame format 300. In the present disclosure, the terms "buffer status", "queue length", and "queue size" are used interchangeably. The buffer status information may be included in a QoS Control field 302 or high throughput (HT) Control field 304. The format of the QoS Control field 302 depends on the sub-type 306 of the frame carrying the QoS Control field. In an example, for a QoS Null frame sent by a non-AP STA, the $8^{th}$-$15^{th}$ bits of the QoS Control field 302 indicates the queue size 308 for the traffic identifier (TID) indicated in Bits 0-3, where each TID corresponds to a certain EDCA AC. The same frame sub-type format can be used by an AP to inform its adjacent APs of its current buffer status information for a certain TID. The queue size or buffer status information may also be included in an HT Control field 304. The HT Control field 304 includes control information 309 that includes variables control 1 to control N. Each of control 1 to control N variable 310 may include a control identification (ID) and control information. In an example, when the control ID=3, the control information contains buffer status report 314 indicating the queue size high 316, which equals the queue size of an AC with AC index (ACI) indicated in the ACI High field, and queue size all 318, which equals the sum of queue sizes for all ACs specified by the ACI Bitmap field.

FIG. 3B illustrates an example of a format of a measurement report frame 330. The measurement report frame 330 contains an STA statistics report including access delay measurements. The measurement report frame 330 includes measurement report elements. Each measurement report element includes a measurement report field 331. The measurement report field includes a group ID 332 indicating the type of statistics included in the Statistics Group Data field. When the group ID 332 is equal to 10, the Statistics Group Data field includes access delay measurements information 336 for each AC.

Figure 4:
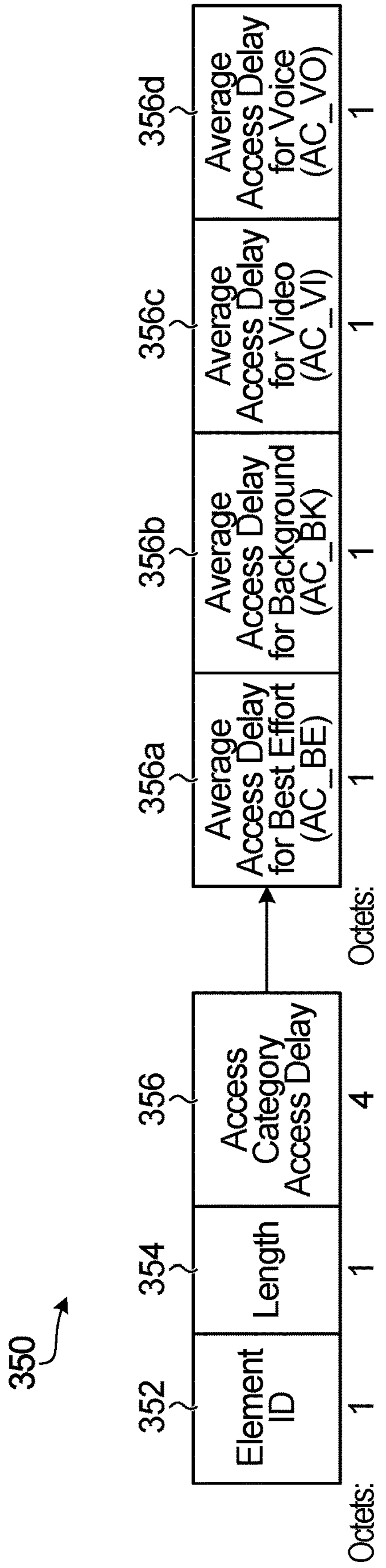
FIG. 4 is an exemplary structure of access category Delay Information Element for coordinated transmit opportunity sharing in FIG. 2.

In the example of FIG. 4 in each transmitted beacon frame of the one or more adjacent APs, the frame header may include an Information Element (IE) 350 for carrying average access delay information. In this example, the IE 350 indicates the average channel access delay encountered by frames transmitted from each EDCA AC during a sliding window. The IE may include an element ID 352 with 1 octet to uniquely identify the IE 350 in the wireless network 100, a length field 354 of the IE 350 with 1 octet to indicate the length of the IE, and AC access delay 356 with 4 octets. Each octet of the AC access delay 356 indicates the average access delay of an AC, such as AC_BE 356*a*, AC_BK 356*b*, AC_VI 356*c*, and AC_VO 356*d*.

The access delay values for a specified AC in a basic service set (BSS) AC Access Delay IE may be scaled as follows:

| | |
|---|---|
| 0: | Access Delay < 8 µs |
| 1: | 8 µs ≤ Access Delay < 16 µs |
| 2 ≤ n ≤ 14: | n < 8 µs ≤ Access Delay < (n ÷ 1) × 8 µs |
| 15: | 120 µs ≤ Access Delay < 128 µs |
| 16: | 128 µs ≤ Access Delay < 144 µs |
| 17 ≤ n ≤ 106: | (n × 16) − 128 µs ≤ Access Delay < ((n + 1) × 16) − 128 µs |
| 107: | 1584 µs ≤ Access Delay < 1600 µs |
| 108: | 1600 µs ≤ Access Delay < 1632 µs |
| 109 ≤ n ≤ 246: | (n × 32) − 1856 µs ≤ Access Delay < ((n + 1) × 32) − 1856 µs |
| 247: | 6048 µs ≤ Access Delay < 6080 µs |
| 248: | 6080 µs ≤ Access Delay < 8192 µs |
| 249: | 8192 µs ≤ Access Delay < 12288 µs |
| 250: | 12288 µs ≤ Access Delay < 16384 µs |
| 251: | 16384 µs ≤ Access Delay < 20480 µs |
| 252: | 20480 µs ≤ Access Delay < 24576 µs |
| 253: | 24576 µs ≤ Access Delay |
| 254: | Service unable to access channel |
| 255: | Measurement not available |

where 255 indicates that an AP did not have any frame for transmission from the specified AC during the measurement window; and 254 indicates that an AP did not transmit any frame from the specified AC during the measurement window, as a result of continuous channel access deferral due to high priority AC transmissions, as required by a clear channel assessment (CCA) mechanism. The term "BSS" refers to a single wireless network operating according to a Wi-Fi protocol.

Reference is made to FIG. 2. After one or more APs, such as AP1 104*a*, AP2 104*b*, AP3 104*c*, AP4 104*d*, and AP5 104*e*, transmit signals containing values of one or more parameters related to data transmission of the one or more APs on the air interface 108, at step 202, one or more of AP1 104*a*, AP2 104*b*, AP3 104*c*, AP4 104*d*, and AP5 104*e* are configured to receive signals containing values of one or more parameters from respective adjacent APs via the air interface 108. An AP may have one or more adjacent APs in a wireless network. Each AP may receive values of parameters of adjacent APs by listening to the values of parameters broadcast or multicast on the air interface 108. For example, AP1 104*a* may be configured to listen to the beacon frames broadcast on the air interface 108 by the adjacent APs, such as by one or more of AP2 104*b*, AP3 104*c*, AP4 104*d*, and AP5 104*e*, and receive via the air interface 108 the values of parameters in the beacon frames of adjacent APs, such as one or more of AP2 104*b*, AP3 104*c*, AP4 104*d*, and AP5 104*e*. Multicast or broadcast of the values of parameters can be performed using IEEE 802.11 standard measurement report frames carrying an STA statistics report, or QoS Null frames, as described above.

After the AP receives the values of one or more parameters of adjacent APs, at step 204, the AP may determine whether the values of the one or more parameters are greater than respective predetermined thresholds.

In the example in Table 1 below, each AP is uniquely identified in a wireless network by its Medium Access Control (MAC) address $m_1, m_2 \ldots, m_n$. The one or more parameters may include average access delay $$d_i^{(j)}$$

and/or current queue length $$q_i^{(j)}$$

of the $j^{th}$ EDCA AC of the $i^{th}$ adjacent AP:

TABLE 1

| Co-AP MAC | AC | | | |
|---|---|---|---|---|
| Address | VO | VI | BE | BK |
| $m_1$ | $q_1^{(1)}$ and $d_1^{(1)}$ | $q_1^{(2)}$ and $d_1^{(2)}$ | $q_1^{(3)}$ and $d_1^{(3)}$ | $q_1^{(4)}$ and $d_1^{(4)}$ |
| $m_2$ | $q_2^{(1)}$ and $d_2^{(1)}$ | $q_2^{(2)}$ and $d_2^{(2)}$ | $q_2^{(3)}$ and $d_2^{(3)}$ | $q_2^{(4)}$ and $d_2^{(4)}$ |
| . . . | . . . | . . . | . . . | . . . |
| $m_n$ | $q_n^{(1)}$ and $d_n^{(1)}$ | $q_n^{(2)}$ and $d_n^{(2)}$ | $q_n^{(3)}$ and $d_n^{(3)}$ | $q_n^{(4)}$ and $d_n^{(4)}$ |

The ACs include AC indices 1 voice (VO), 2 video (VI), 3 best effort (BE), and 4 background (BK). The AC with a lower index has a higher priority. For example, the $1^{st}$ AC VO has a higher priority than the $2^{nd}$ AC video.

If the values of one or more parameters of one or more adjacent APs are greater than respective predetermined thresholds, at step 206, the AP may select from the adjacent APs one or more Co-APs as a first set of Co-APs from the one or more adjacent APs for sharing a TXOP in a subsequent transmission of the AP. By selecting one or more Co-APs as a first set of Co-APS, the AP enables Co-TXOP sharing with the one or more Co-APs.

In some examples, if the value of the received average access delay of an adjacent AP is greater than a predetermined threshold for an EDCA AC, the AP, or the TXOP owner AP, may select the adjacent AP in the set of Co-APs, $\mathcal{C}$, as a candidate Co-AP with which the AP may consider to share a TXOP.

In some examples, an AP, such as AP1 104*a*, may content for accessing a channel using $k^{th}$ AC, where $k \in \{1,2,3,4\}$. The AP determines a first set of Co-APs, $\mathcal{C}$, which includes the indices of all Co-APs considered by the AP for Co-TXOP sharing in a subsequent transmission. The AP may determine the $\mathcal{C}$ set using the average access delay of the adjacent APs by:

$$C = \{i : d_i^{(j)} > \delta_j \text{ for some } j \le k\}, \tag{1}$$

where $$d_i^{(j)}$$

is the average access delay for the $j^{th}$ AC of the $i^{th}$ Co-AP, and $\delta_j$ is a threshold specified for each AC. Formula (1) indicates that an adjacent AP is selected as a Co-AP for consideration by the AP for Co-TXOP sharing in a subsequent transmission of the AP, if the average access delay of the adjacent AP is greater than a predetermined threshold, for example, 0 ms, 0.2 ms, or more, if the $j^{th}$ AC that has a priority equal to or greater than the priority of the $k^{th}$ AC that the AP employs to acquire a TXOP In some examples, if the value of the received current queue length or queue size in a MAC frame for an EDCA AC of an adjacent AP is greater than a predetermined threshold for an EDCA AC, the AP, or the TXOP owner AP, may select the adjacent AP as a candidate Co-AP with which the AP may consider to share a TXOP. For example, the AP may determine the $\mathcal{C}$ set using the current queue length of the data to be transmitted by the adjacent APs by:

$$C = \{i : q_i^{(j)} > \theta_j \text{ for some } j \le k\}, \tag{2}$$

where $$q_i^{(j)}$$

is the queue length for the $j^{th}$ AC of the $i^{th}$ Co-AP, and $\theta_j$ is a threshold specified for each AC. Formula (2) indicates that an adjacent AP is selected as a Co-AP for consideration by the AP for Co-TXOP sharing in a subsequent transmission of the AP if the current queue length is greater than a predetermined threshold for the $j^{th}$ AC that has a priority equal to or greater than the priority of the $k^{th}$ AC that the AP employs to acquire a TXOP. For example, $\theta_j$=0 Kbyte indicates that a Co-AP is selected by the AP if the Co-AP has any data to be transmitted in the queue of the $j^{th}$ AC, where j≤k. $\theta_j$ may also be other integers to indicate that a Co-AP is selected by the AP for consideration for Co-TXOP sharing in a subsequent transmission if the current queue length of the $j^{th}$ AC of the Co-AP exceeds a predetermined length, such as 5 Kbytes, where j≤k.

In some examples, if the value of the received average access delay of an adjacent AP is greater than a first predetermined threshold and the value of the received current queue length is greater than a second predetermined threshold for an EDCA AC that has a priority equal to or greater than the priority of the AC that the AP employs to acquire a TXOP, the AP, or the TXOP owner AP, may select the adjacent AP as a candidate Co-AP with which the AP may consider to share a TXOP. For example, the AP may determine the $\mathcal{C}$ set using both the average access delay and the current queue length of the data to be transmitted by the adjacent AP by:

$$C = \{i : d_i^{(j)} > \delta_j \text{ and } q_i^{(j)} > \theta_j \text{ for some } j \le k\} \tag{3}$$

Formula (3) indicates that an adjacent AP is selected for consideration by the AP as a candidate Co-AP for Co-TXOP sharing in a subsequent transmission of the AP, if the average access delay of the adjacent AP is greater than a first predetermined threshold $\delta_j$, and its current queue length is greater than a second predetermined threshold $\theta_j$, for an AC j, that has a priority equal to or greater than the priority of the AC k, that the AP employs to acquire a TXOP.

In each of formulas (1), (2) and (3), the Co-TXOP sharing is enabled if $\mathcal{C}$ set includes at least one Co-AP, namely $\mathcal{C}$ set is not empty ($\mathcal{C} \neq \phi$).

Figure 5:
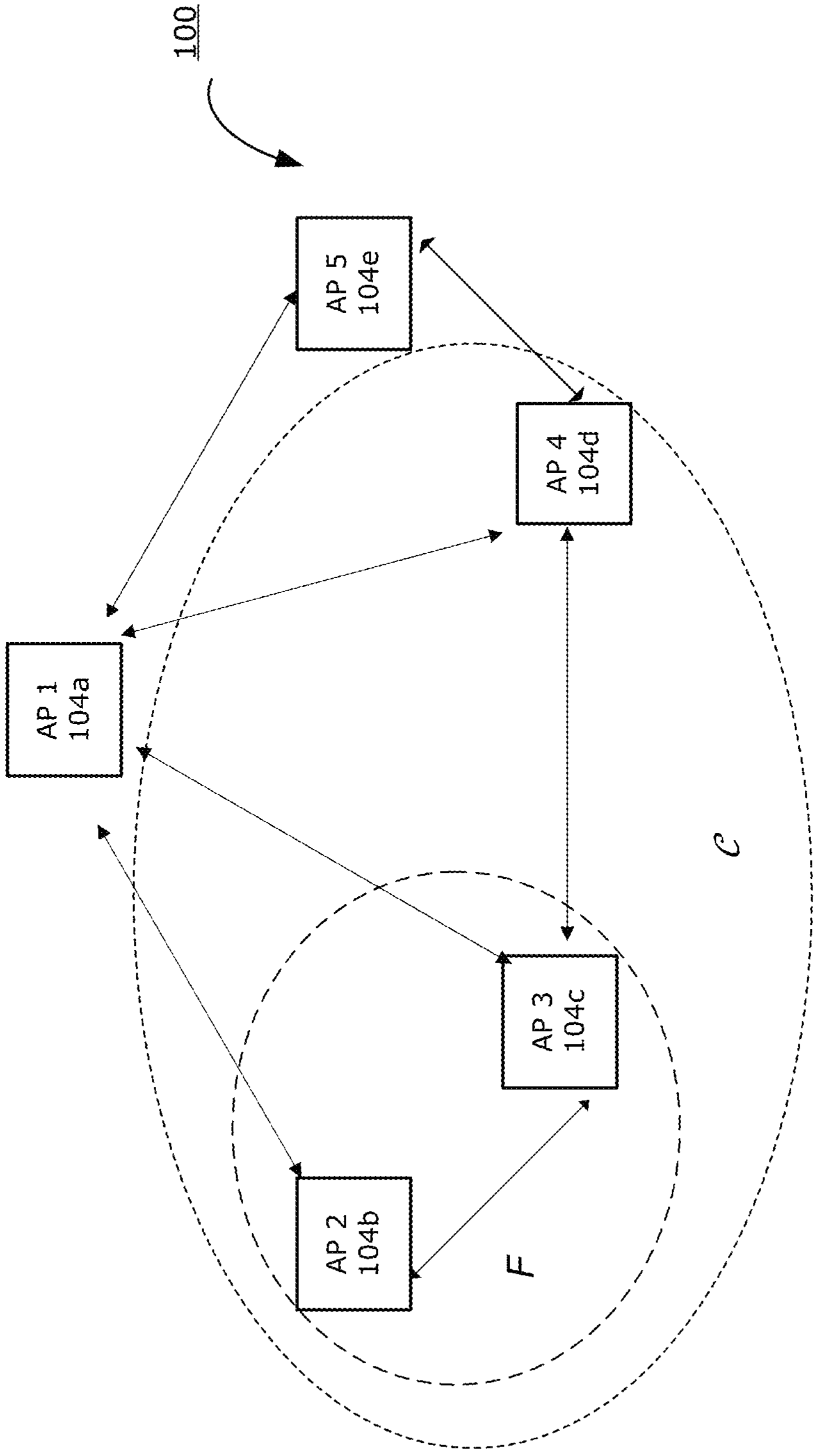
FIG. 5 is a block diagram, showing example embodiments of Co-TXOP sharing enablement and Co-AP selection according to example embodiments described herein.

In the example illustrated in FIG. 5, based on the values of one or more parameters of adjacent APs AP2 104*b*, AP3 104*c*, AP4 104*d*, and AP5 104*e* received by AP1 104, AP1 104*a* may select candidate Co-APs AP2 104*b*, AP3 104*c*, and AP4 104*d* in the $\mathcal{C}$ set for consideration by the AP1 104*a* for Co-TXOP sharing in a subsequent transmission of AP1 104*a*, if the values of one or more parameters are greater than corresponding predetermined thresholds for one or more parameters, by using formula (1), (2), or (3) described above. In the example of FIG. 4, the values of parameters of AP5 104*e* do not meet the predetermined thresholds in formula (1), (2), or (3), and AP1 104*a* excludes AP5 104*e* from the $\mathcal{C}$ set. Similarly, one or more of AP2 104*b*, AP3 104*c*, AP4 104*d*, and AP5 104*e* may select respective candidates Co-APs for consideration for Co-TXOP sharing in a subsequent transmission of AP2 104*b*, AP3 104*c*, AP4 104*d*, or AP5 104*e* by using formula (1), (2), or (3) described above.

After the AP, such as AP1 104*a*, enables Co-TXOP sharing, the AP may use one of various types of Co-TXOP sharing, such as Co-OFDMA 600, coordinated time division multiple access (Co-TDMA) 350, and coordinated spatial frequency reuse (Co-SR) 380.

If the AP shares a TXOP with one or more Co-APs selected from the $\mathcal{C}$ set using Co-TDMA 350, after the AP obtains a TXOP, via channel contention, the AP can share with some Co-APs in the $\mathcal{C}$ set the whole bandwidth for a portion of TXOP duration. If the AP shares a subsequent TXOP with one or more Co-APs selected from the $\mathcal{C}$ set using Co-SR 380, the AP may share the whole TXOP bandwidth for the whole TXOP duration, at the expense of a reduction in transmit power or the modulation and coding scheme (MCS) used.

Figure 6:
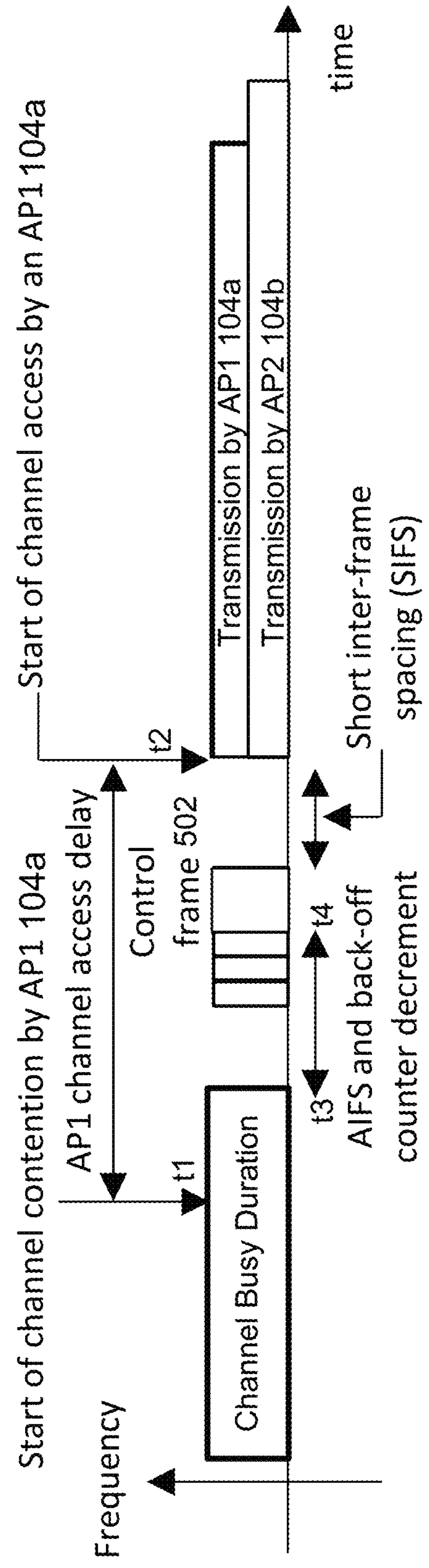
FIG. 6 is a block diagram showing an example of Co-OFDMA.

In some examples, the AP may share a TXOP with one or more Co-APs in the $\mathcal{C}$ set using Co-OFDMA. FIG. 6 illustrates an exemplary Co-OFDMA protocol. As illustrated in the example of FIG. 6, AP1 104*a* selects AP2 104*b* as the Co-AP for Co-OFDMA. After AP1 104*a* starts channel contention at t1, AP1 104*a* obtains a TXOP at t4. In FIG. 6, AP1 104*a*, which is a TXOP owner AP, offers a TXOP to AP2 104*b* by sharing a portion of the TXOP bandwidth for the whole TXOP duration. After the channel becomes idle at t3, after expiry of an arbitrary inter-frame spacing (AIFS) and a back-off duration, at t4, AP1 104*a* may use the control frame 502 to inform AP2 104*b*, with which AP1 104*a* has selected as a Co-AP for TXOP sharing, of the information necessary for Co-OFDMA. For instance, AP1 104*a* may notify AP2 104*b* of the allocated TXOP channel bandwidth for AP2 104*b* in the control frame 502. At t2, AP1 104*a* and AP2 104*b* access the respective portion of the allocated channel bandwidth for the whole TXOP duration.

Figure 7:
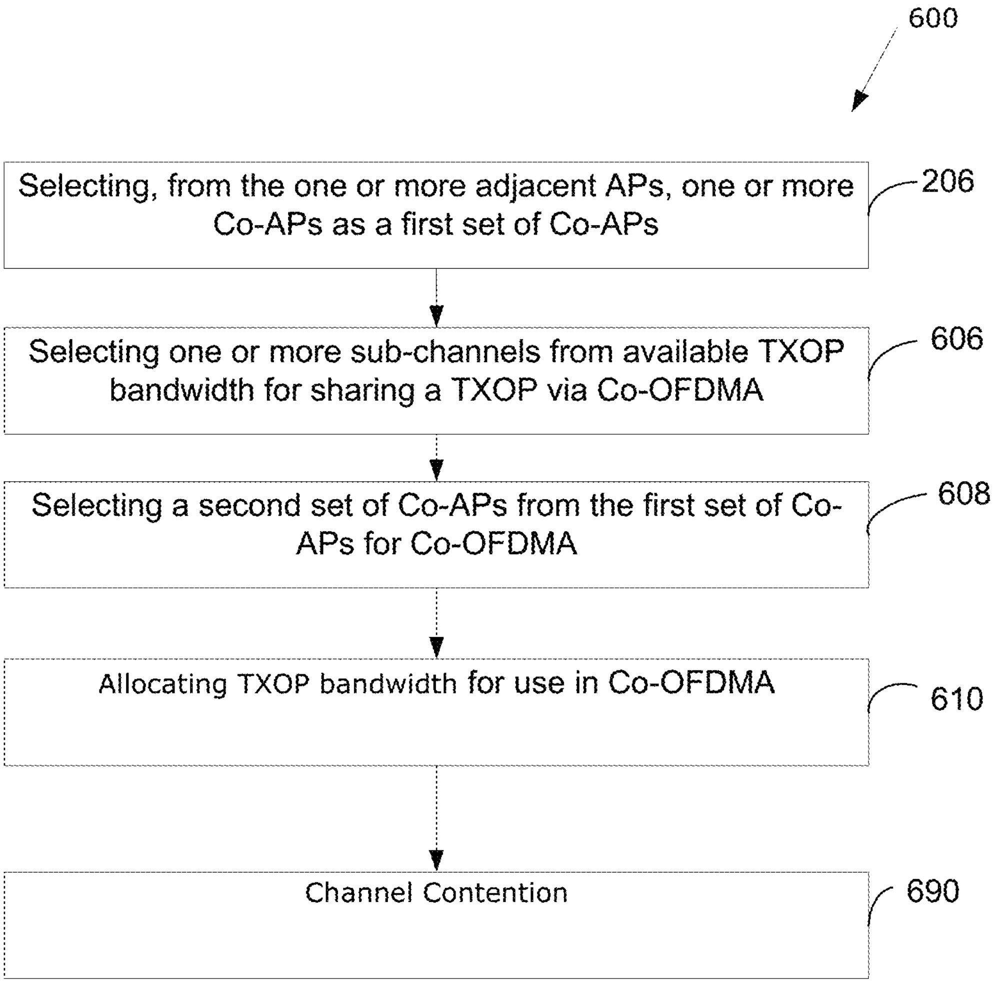
FIG. 7 is a flowchart showing the steps of a method for Co-TXOP sharing via Co-OFDMA.

FIG. 7 illustrates exemplary steps of a method 600 for a TXOP sharing via Co-OFDMA. After the AP has enabled Co-TXOP sharing by selecting, from the one or more adjacent APs, one or more Co-APs as a first set of Co-APS at step 206, at step 606, the AP, such as AP1 104*a*, may select one or more sub-channels from available TXOP bandwidth for use for sharing a subsequent TXOP via Co-OFDMA.

Each of the one or more sub-channels supports the IEEE 802.11 standard and PPDU transmission.

Available TXOP bandwidth is the bandwidth obtained by the AP for transmission of data or packets via channel contention. A sub-channel is a Wi-Fi channel of a certain bandwidth, $b_1$, and may be referred to as a sub-channel of another channel of bandwidth $b_2$ if $b_1<b_2$ and $b_1$ is entirely included in $b_2$. When preamble punctured is employed, a punctured channel is considered a sub-channel of a main, or non-punctured, channel. With respect to an AP, the indices of the primary 20 MHz, primary 40 MHz, primary 80 MHz, and primary 160 MHz channels are respectively denoted by P20, P40, P80, and P160. If the AP supports preamble puncturing, a unique channel index is defined for each preamble puncturing option. For instance, the indices of the primary 80 MHz channel with a punctured secondary 20 MHz, upper 20 MHz in the secondary 40 MHz, or lower 20 MHz in the secondary 40 MHz are respectively denoted by $P80^{(1)}$, $P80^{(2)}$, and $P80^{(3)}$.

For example, based on the available TXOP bandwidth, the AP determines a set of sub-channels, denoted by $\mathcal{N}_i$, which can be used by the AP when Co-OFDMA is used with the $i^{th}$ Co-AP, where $i \in \mathcal{C}$. The $\mathcal{N}_i$ set consists of the set of all sub-channels of the TXOP bandwidth, where each sub-channel member of the $\mathcal{N}_i$ set is allowed for access by the IEEE 802.11 standard, for example via preamble puncturing, and does not include the primary 20 MHz channel of the $i^{th}$ Co-AP, $i \in \mathcal{C}$.

The sub-channels of a TXOP bandwidth may be selected without significant increase in the PPDU transmission duration or PER provided to the primary STA. For instance, if the AP transmits data of an AC, such as VO, the AP may select a sub-channel if the increase in the PPDU transmission duration and control frame overhead of the AP by using this sub-channel instead of the whole TXOP bandwidth is below a predetermined threshold, such as 10%, and the increase in PER is below another predetermined threshold, such as 0.1.

With the $\mathcal{N}_i$ set $\forall i \in \mathcal{C}$, at step 608, the AP selects one or more Co-APs as a second set of Co-APs, denoted by $\mathcal{F}$, from the first set of Co-APs, such that $$\mathcal{F} = \{i \in \mathcal{C} : \mathcal{N}_i \neq \phi\}. \quad (4)$$

The AP may potentially share a TXOP via Co-OFDMA with the Co-APs in the $\mathcal{F}$ set. Formula (4) denotes that the AP selects a set of Co-APs from the first set $\mathcal{C}$ of Co-APs and forms the second set of Co-APs, $\mathcal{F}$. The $i^{th}$ Co-AP in the second set, $\mathcal{F}$, can use one or more sub-channels of the TXOP bandwidth, without changing its primary 20 MHz channel, if the TXOP owner AP uses any sub-channel member of set $\mathcal{N}_i$ for sharing a subsequent TXOP via Co-OFDMA. In the example of FIG. 5, second set $\mathcal{F}$ of Co-APs comprises AP2 104*b* and AP3 104*c*.

In some examples, based on the values of parameters contained in the signals received by the AP from the air interface 108 from the Co-APs, such as the average channel access delay and/or queue length of each Co-AP from the $\mathcal{F}$ set, the AP may further select one or more Co-APs as a third set of Co-APs $\mathcal{J}$ for Co-OFDMA from the second set $\mathcal{F}$ for Co-TXOP sharing via Co-OFDMA.

For instance, if the AP selects one Co-AP from the $\mathcal{F}$ set for Co-OFDMA, this selection can be performed by using a largest-weighted delay first approach, i.e., selecting a Co-AP from the $\mathcal{F}$ set that reports a largest weighed average access delay for an EDCA AC, after multiplying the received average access delay value by a certain constant or weight, which depends on the EDCA AC priority. An EDCA AC has a higher weight when the EDCA AC has a higher priority. For examples, a VO AC has a higher priority than a BK AC. Similarly, the AP may also select two or more Co-APs as the third set of Co-APs $\mathcal{J}$ from the $\mathcal{F}$ set for Co-OFDMA, by selecting two Co-APs that report a first and second largest average access delay for an EDCA AC, after multiplying the value of the receive average access delay by a weight.

For example, from the $\mathcal{F}$ set, the AP selects for Co-OFDMA the $n^{th}$ Co-AP with the highest value of the largest weighted average channel access delay as the third set of Co-APs $\mathcal{J}$, as denoted by:

$$n = \arg\max_{i \in \mathcal{F}} \left( \max_{j \le k} \gamma_j d_i^{(j)} \right), \quad (5)$$

where $\gamma_j$ is a weight based on the AC index j, $$d_i^{(j)}$$

is the average channel access delay of the $j^{th}$ AC of the $i^{th}$ Co-AP in set $\mathcal{F}$. The notation $$\left( \max_{j \le k} \gamma_j d_i^{(j)} \right)$$

indicates the maximal value of the weighted average channel access delays of the $i^{th}$ Co-AP's ACs with priorities equal to or greater than the priority of the AC, k, which the TXOP owner employs to acquire a TXOP. The notation $$\max_{i \in \mathcal{F}} \left( \max_{j \le k} \gamma_j d_i^{(j)} \right)$$

indicates the maximal value of the weighted average channel access delays of all the Co-APs in the $\mathcal{F}$ set, by considering only the ACs with priorities equal to or greater than the priority of the AC, k, which the TXOP owner employs to acquire a TXOP.

In some examples, if the AP selects only one Co-AP for Co-OFDMA, this selection can be performed by using a largest-weighted queue length, i.e., selecting one Co-AP that reports a largest weighted current queue length for an EDCA AC, after multiplying this reported queue length by a certain constant or weight, based on the EDCA AC priority. Similarly, the AP may also select two or more Co-APs as the third set of Co-APs $\mathcal{J}$ from the $\mathcal{F}$ set for Co-OFDMA, by selecting two Co-APs that report the first and second largest queue length for an EDCA AC, after multiplying the received queue length value by a weight.

In some examples, the AP may select one or more Co-APs as the third set of Co-APs $\mathcal{J}$ from the $\mathcal{F}$ set for Co-TXOP sharing via Co-OFDMA, when both the weighted average access delay and weighted queue length reported by a Co-AP meet respective predetermined criteria.

After identifying the second set $\mathcal{F}$ of Co-APs or the third set $\mathcal{J}$ of Co APs, at step 610, the AP may allocate TXOP bandwidth for the AP and the selected Co-APs for use in Co-OFDMA. For example, the AP may select a Co-OFDMA sub-channel for each Co-AP in the set $\mathcal{J}$ or $\mathcal{F}$. All the selected sub-channels for the AP and Co-APs of set $\mathcal{J}$ are non-overlapping. Any two selected sub-channels do not include a common 20 MHz channel. This non-overlapping channel allocation can be performed via different methods. For instance, if the TXOP owner selects only one Co-AP in set $\mathcal{J}$ for Co-OFDMA, i.e., $[\mathcal{J}]=1$, denoted by the $n^{th}$ Co-AP, the TXOP owner may access a sub-channel from the $\mathcal{N}_n$ set that maximizes the AP's goodput and allocate the remaining TXOP bandwidth to the $n^{th}$ Co-AP.

In some examples, the channels allocated to the AP and the selected Co-AP, respectively denoted by a and b, may be determined as follows:

$$a = \arg\max_{c \in \mathcal{N}_n} R^{(c)} \times \left(1 - E^{(c)}\right), \tag{6}$$

where n is the index of the selected Co-AP, $R^{(c)}$ and $E^{(c)}$ respectively denote the data rate and packet error rate (PER) for data transmission to a primary STA over a channel of index c from the set of sub-channels $\mathcal{N}_n$, a is the sub-channel that maximizes the goodput for the AP, namely the TXOP owner AP, and b is the channel of the largest bandwidth that can be accessed by the $n^{th}$ Co-AP among the set of sub-channels that are entirely included in the remaining TXOP bandwidth after excluding sub-channel a.

At step 690, the AP may contend for the channel to transmit data, as illustrated at t1 in FIG. 6. After the channel is obtained, the AP may share a TXOP with the one or more Co-APs selected from the $\mathcal{J}$ or $\mathcal{F}$ set at step 608. The Co-APs in the set $\mathcal{J}$ or $\mathcal{F}$ may use the sub-channels of the TXOP bandwidth allocated by the AP at step 610 to transmit data.

By properly enabling Co-TXOP sharing and appropriately selecting Co-APs with which a TXOP owner AP can share its TXOP via Co-OFDMA, the present application balances the trade-off between the reduction of channel access delay and the increase of a PPDU transmission duration and additional control frame exchange, and minimizes the total packet delivery delay for Co-APs.

Figure 8A:
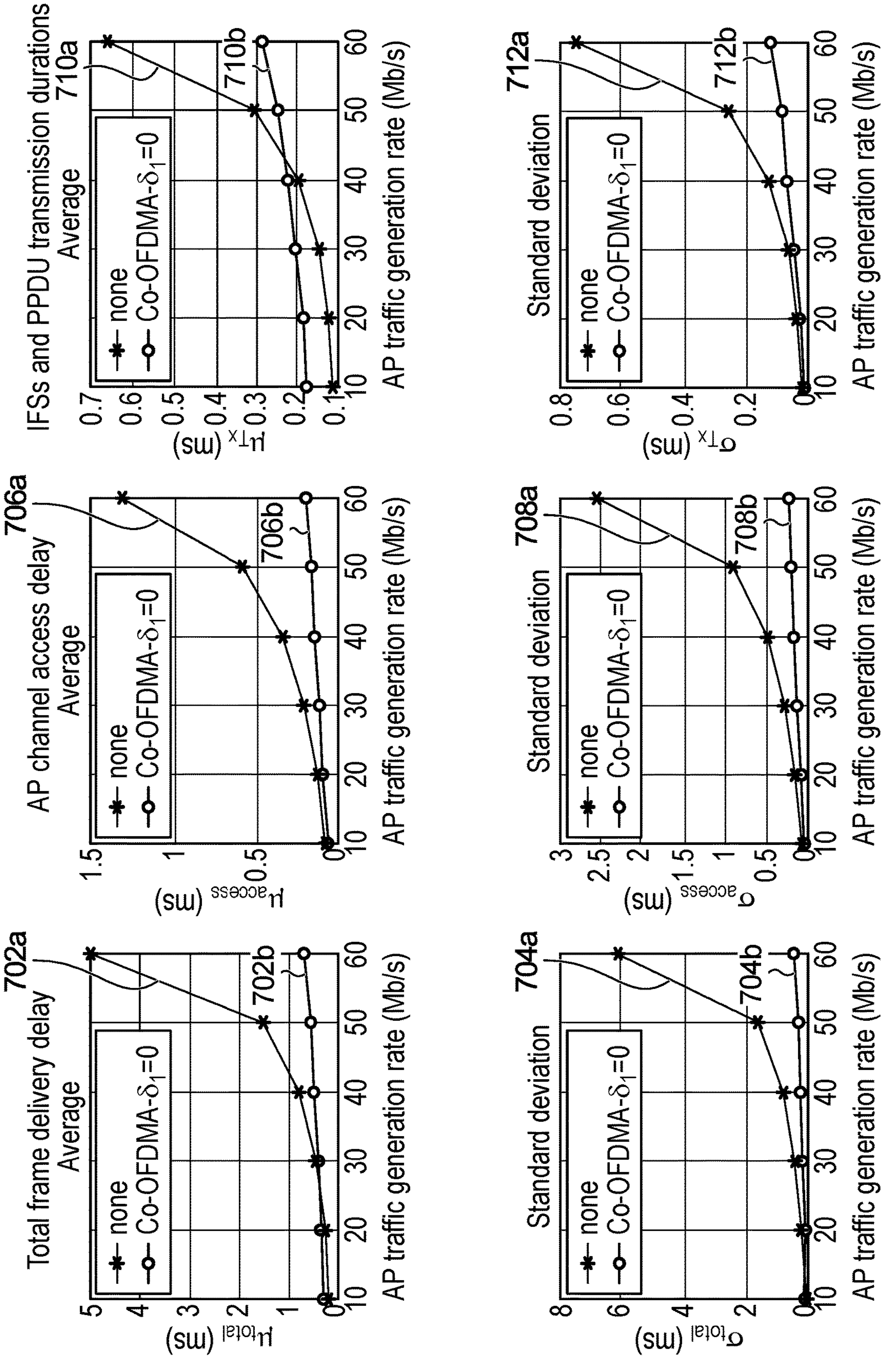
FIG. 8A are diagrams showing simulation results using the methods in FIG. 2 and FIG. 6 with $\delta_1=0$.
Figure 8B:
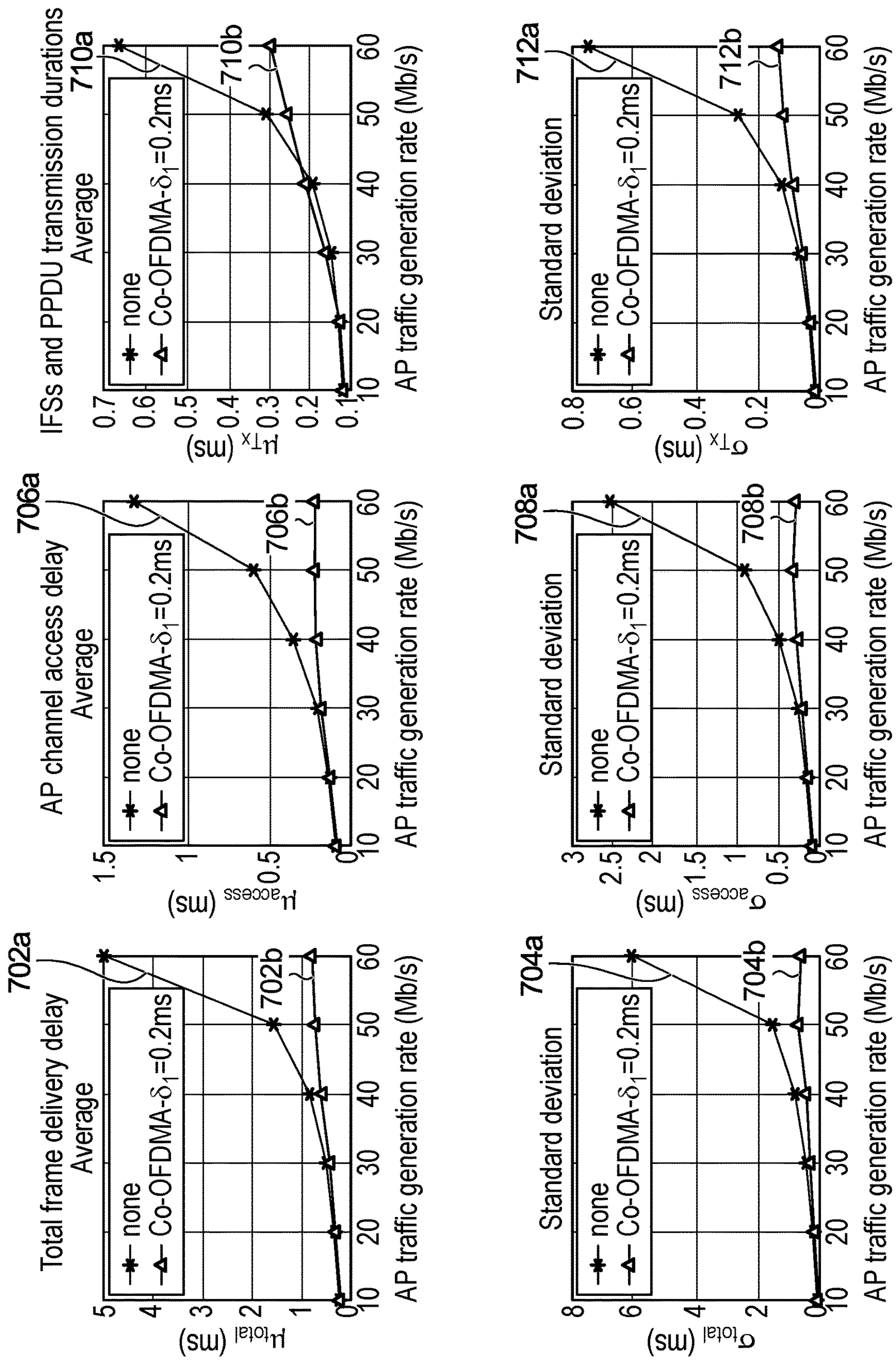
FIG. 8B are diagrams showing simulation results using the method in FIG. 2 and FIG. 6 with $\delta_1=0.2$ ms.

Computer simulation results in FIGS. 8A and 8B indicate the effects of the TXOP enablement method 200 and the TXOP sharing via Co-OFDMA method 600 on the aggregated goodput and total frame delivery delay. Two Co-APs are included in the simulation for TXOP sharing via Co-OFDMA. The two Co-APs operate over a 40 MHz channel, each Co-AP using a unique primary 20 MHz channel. In the simulation, each of the Co-APs serves one STA, all the Co-APs are within the carrier sensing range of each other, and the employed AC is of type voice (VO) for all Co-APs. The application layer traffic generation rate in the simulation varies from 10 Mbps to 60 Mbps.

As illustrated in the simulation results in FIG. 8A, formula (1) is used in method 200, and $\delta_1=0$, indicating that Co-OFDMA method 600 is enabled for each TXOP of a Co-AP. In the simulation by using the methods 200 and 600, when the AP traffic generation rate increases, the mean of the total frame delay 702*b*, standard deviation of the total frame delay 704*b*, mean of AP channel access delay 706*b*, standard deviation of AP channel access delay 708*b*, and standard deviation of the sum of inter-frame spacings (IFSs) and PPDU transmission durations 712*b* of Co-APs are significantly improved over the mean of the total frame delay 702*a*, standard deviation of the total frame delay 704*a*, mean of AP channel access delay 706*a*, standard deviation of AP channel access delay 708*a*, and standard deviation of the sum of IFSs and PPDU transmission durations 712*a* without employing Co-TXOP sharing, respectively.

However, at the low traffic generation rate, such as 10-40 Mb/s, the mean of the sum of IFSs and PPDU transmission durations 710*b* of Co-APs employing methods 200 and 600 is higher than the mean of the sum of IFSs and PPDU transmission durations 710*a* without employing Co-TXOP sharing. Notwithstanding this impact, in FIG. 8A, the mean of the total frame delay 702*b* and standard deviation of the total frame delay 704*b* of Co-APs are improved over the total frame delay 702*a* and standard deviation of the total frame delay 704*a* without employing Co-TXOP sharing.

As illustrated in the simulation results in FIG. 8B, formula (1) is used in method 200, and $\delta_1=0.2$ ms, indicating that Co-OFDMA method 600 is enabled for a TXOP if the average channel access delay of a Co-AP is greater than 0.2 ms. In addition to the improvements in the mean of the total frame delay 702*b*, standard deviation of the total frame delay 704*b*, mean of AP channel access delay 706*b*, standard deviation of AP channel access delay 708*b*, and standard deviation of the sum of IFSs and PPDU transmission durations 712*b* of Co-APs as illustrated in FIG. 7A, the mean of the sum of IFSs and PPDU transmission durations 710*b* of Co-APs is also improved at the low traffic generation rate, such as 10-40 Mb/s, in that the mean of the sum of IFSs and PPDU transmission durations 710*b* of Co-APs employing methods 200 and 600 is only slightly higher than the mean of the sum of IFSs and PPDU transmission durations 710*a* without employing Co-TXOP sharing. As well, in FIG. 7B, the mean of the total frame delay 702*b* and standard deviation of the total frame delay 704*b* of Co-APs are improved over the mean of the total frame delay 702*a* and standard deviation of the total frame delay 704*a* without employing Co-TXOP sharing.

Figure 9:
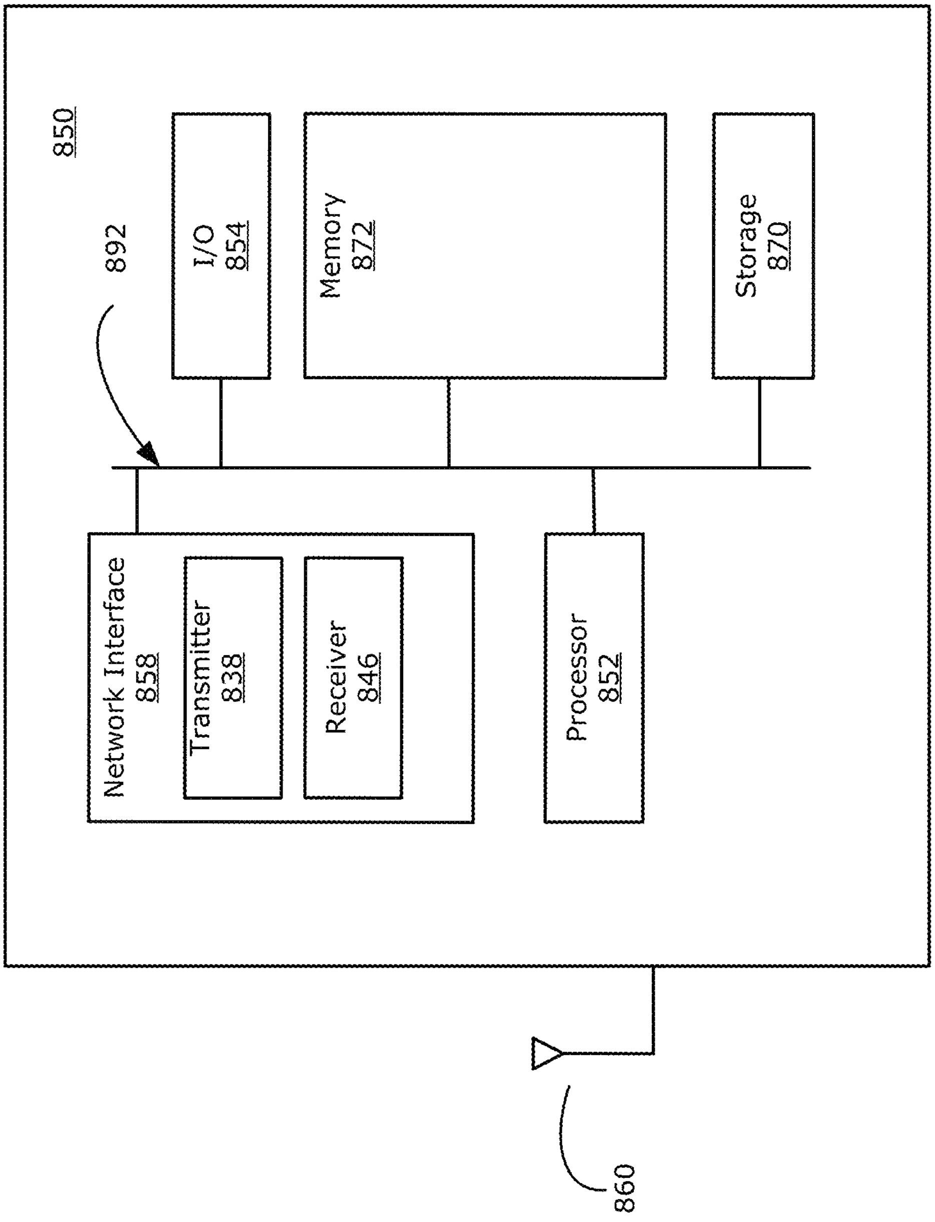
FIG. 9 is a block diagram of an example device used for Co-TXOP sharing according to example embodiments described herein.

FIG. 9 illustrates an example device 850 which may be used to implement methods 200 and 600 described herein. The device 850 may be an AP, such as AP1 104*a*, AP2 104*b*, AP3 104*c*, AP4 104*d*, and AP5 104*e* in wireless network 100. Other devices suitable for implementing the methods described in the present disclosure may be used, which may include components different from those discussed below. Although FIG. 9 shows a single instance of each component, there may be multiple instances of each component in the device 850.

The device 850 may include one or more processors 852, such as a central processing unit (CPU), a microprocessor, an application-specific integrated circuit (ASIC), a field-programmable gate array (FPGA), dedicated logic circuitry, or combinations thereof. The device 850 may also include one or more input/output (I/O) interfaces 854, which may enable interfacing with one or more appropriate input devices and/or output devices (not shown). One or more of the input devices and/or output devices may be included as a component of the device 850 or may be external to the device 850. The device 850 may include one or more network interfaces 858 for wired or wireless communication with a network. In example embodiments, network interfaces 858 include one or more wireless interfaces such as transmitter 838 and receiver 846 that enable communications in wireless network 100. The network interface(s) 858 may include interfaces for wired communication links (e.g., Ethernet cable) and/or wireless communication links (e.g., one or more radio frequency links) for intra-network and/or inter-network communications. The network interface(s) 858 may provide wireless communication via one or more transmitters or transmitting antennas, one or more receivers or receiving antennas, and various signal processing hardware and software, for example. In this regard, some network interface(s) 858 may include respective processing systems that are similar to device 850. In some embodiments, the network interface(s) 858 may manage transmission and reception parameters such as transmit power and packet detection (PD) level, whereas in other embodiments one or both of these parameters may be set by the processor 852. In this example, a single antenna 860 is shown, which may serve as both transmitting and receiving antenna. However, in other examples there may be separate antennas for transmitting and receiving. The network interface(s) 858 may be configured for sending and receiving data to the backhaul network 102 or to STAs 106*a*, 106*b*, 106*c*, 106*d* and 106*e*, user devices, access points, reception points, transmission points, network nodes, gateways or relays (not shown) in the wireless network 100.

The device 850 may also include one or more storage units 870, which may include a mass storage unit such as a solid state drive, a hard disk drive, a magnetic disk drive and/or an optical disk drive. The device 850 may include one or more memories 872, which may include a volatile or non-volatile memory (e.g., a flash memory, a random access memory (RAM), and/or a read-only memory (ROM)). The non-transitory memory(ies) 872 may store instructions for execution by the processor 852, such as to carry out the present disclosure. The memory(ies) 872 may include other software instructions, such as for implementing an operating system and other applications/functions. In some examples, one or more data sets and/or module(s) may be provided by an external memory (e.g., an external drive in wired or wireless communication with the device 850) or may be provided by a transitory or non-transitory computer or processor-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

In some embodiments, the memory 872 may store data used by the processor 852 to implement the methods and operations described herein, for example, the parameters from adjacent APs, the Co-AP sets $\mathcal{C}$, $\mathcal{F}$, etc.

There may be a bus 892 providing communication among components of the device 850, including the controller(s) 852, I/O interface(s) 854, network interface(s) 858, storage unit(s) 870, memory(ies) 872. The bus 892 may be any suitable bus architecture including, for example, a memory bus, a peripheral bus or a video bus.

Certain adaptations and modifications of the described embodiments can be made. Therefore, the above discussed embodiments are considered to be illustrative and not restrictive.

The present disclosure provides certain example algorithms and calculations for implementing examples of the disclosed methods and operations. However, the present disclosure is not bound by any particular algorithm or calculation. Although the present disclosure describes methods and processes with steps in a certain order, one or more steps of the methods and processes may be omitted or altered as appropriate. One or more steps may take place in an order other than that in which they are described, as appropriate.

Through the descriptions of the preceding embodiments, the present invention may be implemented by using hardware only, or by using software and a necessary universal hardware platform, or by a combination of hardware and software. Based on such understandings, the technical solution of the present invention may be embodied in the form of a software product. The software product may be stored in a non-volatile or non-transitory storage medium, which can be a compact disk read-only memory (CD-ROM), USB flash drive, or a hard disk. The software product includes a number of instructions that enable a computer device (personal computer, server, or network device) to execute the methods provided in the embodiments of the present invention.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method comprising:

receiving from each of one or more adjacent access points (APs), at an AP, a signal containing values of one or more parameters related to data transmission;

determining, at the AP, whether the values of the one or more parameters are greater than respective predetermined thresholds for the one or more parameters;

responsive to the values of the one or more parameters greater than the respective predetermined thresholds, selecting, by the AP, one or more coordinated APs (Co-APs) as a first set of Co-APs from the one or more adjacent APs for sharing a transmit opportunity (TXOP) in a subsequent transmission of the AP; and selecting, by the AP, one or more sub-channels from available TXOP bandwidth for the AP to share the TXOP via coordinated orthogonal frequency division multiple access (Co-OFDMA), each of the one or more sub-channels supporting IEEE 802.11 standard and physical layer protocol data unit (PPDU) transmission, wherein when the AP transmits data of an access category (AC) using any one of the one or more sub-channels, increase in PPDU transmission duration and control frame overhead is below a third predetermined threshold, and increase in packet error rate (PER) is below a fourth predetermined threshold.

2. The method of claim 1, wherein the one or more parameters comprises average channel access delay for one or more ACs of enhanced distributed channel access (EDCA) for frames transmitted from each EDCA AC in a sliding time window of each of the one or more adjacent APs.

3. The method of claim 2, wherein the respective predetermined thresholds comprise one threshold of 0 ms or greater than 0 ms.

4. The method of claim 1, wherein the one or more parameters comprises current queue size for one or more ACs of enhanced distributed channel access (EDCA) of each of the one or more adjacent APs, and wherein the respective predetermined thresholds comprise one threshold of 0 Kbyte or greater than 0 Kbyte.

5. The method of claim 1, wherein for one or more ACs of enhanced distributed channel access (EDCA) of each of the one or more adjacent APs, the one or more parameters comprises a first parameter of average channel access delay and a second parameter of current queue size.

6. The method of claim 5, wherein the first parameter is associated with a first predetermined threshold of 0 ms or greater than 0 ms, and the second parameter is associated with a second predetermined threshold of 0 Kbyte or greater than 0 Kbyte.

7. The method of claim 5, wherein the one or more parameters are periodically multicast or broadcast by each of the one or more adjacent APs using a beacon frame, an IEEE 802.11 standard measurement report frame, or a quality of service (QoS) Null frame.

8. The method of claim 7, wherein the beacon frame includes a basic service set (BSS) AC Delay Information Element, the IEEE 802.11 standard measurement report frame includes an IEEE 802.11 standard station (STA) Statistics report, and a header of the IEEE 802.11 standard measurement report frame, or the quality of service (QoS) Null frame comprises buffer status information in a QoS Control field or a high throughput (HT) Control field.

9. The method of claim 8, wherein the STA Statistics report comprises the average access delay of one or more AC types of best effort (BE), background (BK), video (VI), and voice (VO), or the QoS Control field, or the HT Control field comprises the current queue size of one or more AC types of BE, BK, VI, and VO.

10. The method of claim 1, wherein the AP shares the TXOP with the one or more Co-APs via Co-OFDMA; or wherein the AP shares the TXOP with the one or more Co-APs via coordinated time division multiple access (Co-TDMA); or wherein the AP shares the TXOP with the one or more Co-APs via coordinated spatial frequency reuse (Co-SR).

11. The method of claim 1, further comprising:

selecting, by the AP, a second set of Co-APs from the first set of Co-APs, wherein each Co-AP in the second set of Co-APs accesses a primary 20 MHz channel that is excluded in at least one of the one or more sub-channels selected by the AP for possible TXOP sharing via Co-OFDMA.

12. The method of claim 11, further comprising:

selecting, by the AP, a third set of Co-APs from the second set of Co-APs, wherein the third set of Co-APs comprises one Co-AP that reports a largest weighted average access delay, or a largest-weighted queue size for an enhanced distributed channel access (EDCA) AC.

13. The method of claim 12, wherein a weight of the largest weighted average access delay or the largest weighted queue size is based on a priority of the EDCA AC.

14. The method of claim 12, further comprising allocating by the AP a first sub-channel for the AP from the one or more sub-channels, and allocating, by the AP, for each Co-AP in the third set of Co-APs, a second sub-channel from remaining available TXOP bandwidth, wherein the first sub-channel and the second sub-channel are non-overlapping.

15. The method of claim 14, wherein the sub-channel for the AP is selected to increase goodput of the AP relative to other available sub-channels.

16. The method of claim 1, wherein each of the respective predetermined thresholds is associated with a first AC of enhanced distributed channel access (EDCA), and wherein the first AC has a first priority equal to or greater than a second priority of a second AC that the AP employs to acquire the TXOP.

17. An Access Point (AP), comprising:

a processor, a memory storing instructions for execution by the processer, wherein the instructions, when executed by the processor, cause the AP to perform a method comprising:

receiving, from each of one or more adjacent APs, a signal containing values of one or more parameters related to data transmission;

determining whether the values of the one or more parameters are greater than respective predetermined thresholds for the one or more parameters;

responsive to the values of the one or more parameters greater than the respective predetermined thresholds, selecting one or more coordinated APs (Co-APs) as a first set of Co-APs from the one or more adjacent APs for sharing a transmit opportunity (TXOP) in a subsequent transmission of the AP; and selecting one or more sub-channels from available TXOP bandwidth for the AP to share the TXOP via coordinated orthogonal frequency division multiple access (Co-OFDMA), each of the one or more sub-channels supporting IEEE 802.11 standard and physical layer protocol data unit (PPDU) transmission, wherein when the AP transmits data of an access category (AC) using any one of the one or more sub-channels, increase in PPDU transmission duration and control frame overhead is below a third predetermined threshold, and increase in packet error rate (PER) is below a fourth predetermined threshold.

18. The AP of claim 17 wherein each of the respective predetermined thresholds is associated with a first AC of enhanced distributed channel access (EDCA), and wherein the first AC has a first priority equal to or greater than a second priority of a second AC that the AP employs to acquire the TXOP.

19. A non-transitory processor readable medium having tangibly stored thereon executable instructions that, when executed by a processor, cause the processor to perform a method at an access point (AP) comprising:

receiving, from each of one or more adjacent APs, a signal containing values of one or more parameters related to data transmission;

determining whether the values of the one or more parameters are greater than respective predetermined thresholds for the one or more parameters; and responsive to the values of the one or more parameters greater than the respective predetermined thresholds, selecting one or more coordinated APs (Co-APs) as a first set of Co-APs from the one or more adjacent APs for sharing a transmit opportunity (TXOP) in a subsequent transmission of the AP; and selecting, by the AP, one or more sub-channels from available TXOP bandwidth for the AP to share the TXOP via coordinated orthogonal frequency division multiple access (Co-OFDMA), each of the one or more sub-channels supporting IEEE 802.11 standard and physical layer protocol data unit (PPDU) transmission, wherein when the AP transmits data of an access category (AC) using any one of the one or more sub-channels, increase in PPDU transmission duration and control frame overhead is below a third predetermined threshold, and increase in packet error rate (PER) is below a fourth predetermined threshold.

* * * * *